United States Patent [19]
Clayton et al.

[11] Patent Number: 5,313,190
[45] Date of Patent: May 17, 1994

[54] DETECTOR FOR PROTECTING AIR DAMS OF MOTOR VEHICLES

[76] Inventors: Ruben E. Clayton, 34338 Kenwood Dr., Fremont, Calif. 94555; John M. Mueller, 6621 W. Roosevelt, Phoenix, Ariz. 85043

[21] Appl. No.: 894,452

[22] Filed: Jun. 5, 1992

[51] Int. Cl.$^5$ .................................... B60Q 1/00
[52] U.S. Cl. ......................... 340/436; 340/437; 340/932.2; 340/562; 307/9.1; 307/10.1; 180/167; 180/274; 200/61.44
[58] Field of Search ............... 340/436, 437, 435, 903, 340/932.2, 562, 597, 599, 665; 307/9.1, 10.1; 180/167, 274; 200/61.42, 61.44

[56] References Cited

U.S. PATENT DOCUMENTS

| | | | |
|---|---|---|---|
| 3,533,061 | 10/1970 | Treiterer | 340/903 |
| 3,786,507 | 1/1974 | Hurd, Jr. | 343/7 |
| 3,789,950 | 2/1974 | Strenalein | 180/98 |
| 4,260,980 | 4/1981 | Bates | 340/903 |
| 4,352,090 | 9/1982 | Ohama | 340/563 |
| 4,437,428 | 3/1984 | Hoffelner | 116/137 |
| 4,683,974 | 8/1987 | Richardson | 180/274 |
| 4,712,098 | 12/1987 | Laing | 340/669 |
| 4,737,001 | 4/1988 | Moss | 350/3.6 |
| 4,825,211 | 4/1989 | Park | 340/901 |
| 4,887,066 | 12/1989 | Marek | 340/436 |
| 4,974,215 | 11/1990 | Bolz et al. | 367/108 |

Primary Examiner—Donnie L. Crosland
Attorney, Agent, or Firm—Robert Charles Hill

[57] ABSTRACT

A motor vehicle sensing and warning circuit is described that includes a series of N Schmitt triggers with MOS P-channel and N-channel enhancement devices included in a single monolithic structure to perform waveform generation, sensing, comparison and control functions. The Schmitt triggers are configured to deliver as an astable oscillator in circuit with a sensing antenna through a balance circuit as well as deliver as an audio oscillator to drive a piezo element to alert the driver of the presence of an invading object that should be avoided. Shaping and conditioning of the reference waveform are generated by the free running oscillator, as is a comparison function in association with a series of strobing diodes resulting in a strobed output summing function between a Schmitt sensing trigger and a Schmitt reference trigger associated with the free running oscillator. The resulting inverted output is then connected to a pair of signal comparators which have their non-inverting inputs connected to a set point reference source. In operation, as the object to be avoided is sensed by the antenna, the strobed output is modulated by such effects. As a result, an amplified output signal appears at the inverted inputs of the signal comparators. As the output state of the comparators goes HI, visual and audio indicators adjacent to the operator of the vehicle are driven to active states. Evasive action then can be initiated.

11 Claims, 5 Drawing Sheets

DETECTOR FOR PROTECTING AIR DAMS OF MOTOR VEHICLES

FIELD OF INVENTION

This invention relates to motor vehicles having plastic, fiberglass, or composition air dams extending forward of the front wheels and more particularly to circuitry using monolithically structured circuit elements for detecting objects such as a concrete tire stop or the like, and then alerting the operator of the vehicle. Result: evasive action can occur.

In one aspect the circuitry of the invention includes a series of N Schmitt Triggers with MOS P-channel and N-channel enhancement devices in a single monolithic structure to perform waveform generation, sensing, comparison and control functions. The Schmitt Triggers are configured to deliver as a free-running astable oscillator in circuit with a sensing antenna through a balance circuit as well as deliver as an audio oscillator to drive piezo element to alert the driver of the presence of an invading mass of concrete adjacent to the sensing antenna.

Shaping and conditioning of the reference waveform generated by the free running oscillator are also provided, as is a comparison function in association with a series of strobing diodes resulting in a strobed output summing function between a Schmitt sense and a Schmitt reference trigger associated with the free running oscillator. The resulting inverted output is then connected to a pair of signal comparators. Such comparators have their noninverting inputs connected to a set point reference delivered to the comparators.

As an obstructing mass is sensed by the antenna (due to changed dielectric effect), the strobed output generated by the Schmitt Triggers is modulated by the effects provided by the object. As a result, an inverted, and amplified object output signal appears at the inverted inputs of the signal comparators, which is lower than the set point reference of the system. As the output state of the comparators goes HI, visual and audio indicators adjacent to the operator of the vehicle are driven to active states. Consequently, the operator of the vehicle is warned of the obstructing objects adjacent to the air dam well before impact occurs. Evasive action then can be initiated.

In another aspect of the invention the circuitry provides an automatic calibration function for linearizing operations via a automatic calibration circuit that on power-up, delivers a rising biasing level to provide auto calibration, sample-and-hold function in circuit with the Schmitt sense and reference triggers.

BACKGROUND OF THE INVENTION

In order to reduce aerodynamic drag, an air dam can be mounted forward of the front wheels of a motor vehicle. The dam also improves front end appearance of many vehicles by concealing the front end suspension and underside of the engine. The dam usually includes a central portion extending transverse of the body of the vehicle and a pair of wraparound corner portion that are longitudinal of the body. The corner portions may be separately molded from the central portion using a variety of plastics materials or together as a one-piece construction. In either case, the molder can select the characteristic of the plastics used in the molding to provide a light-weight panel at minimum costs. However, the strength of the dam is usually not great enough to withstand heavy impacts with low profile objects such as concrete parking bumpers, stops and the like, such bumpers being typically encountered in parking lots surrounding shopping malls and the like.

In U.S. Pat. No. 4,683,974 there is described an electromechanical switch having a switch contact that is mounted adjacent to the dam. As the dam is mechanically moved a preselected amount, the switch is closed placing a battery in circuit with a buzzer and a light. However, since activation is dependent upon mechanical movement of the dam, the correct installation and maintenance of such switches is essential and necessitate that actual contact occur between the structure to be protected and the object to be avoided.

In U.S. Pat. No. 4,352,090 there is shown a device in which an oscillator either oscillates or does not oscillate depending upon the capacitance between probes wherein obstacles to be avoided provide a dielectric effect or extended electrical ground and in that way a GO-NO GO alarm is controlled. However, since detection is dependent upon oscillator function, proper maintenance of the oscillator including calibration, is essential. Moreover, it would be desirable that the time interval after warning (but before actual impact between the dam and the object) be lengthened so that the operator of the vehicle can take evasive action.

SUMMARY OF THE INVENTION

In accordance with the present invention, motor vehicle sensing and warning circuitry that is continuously operational after initiation with an associated auto-calibration function incorporated therein, includes a series of N Schmitt Triggers with MOS P-channel and N-channel enhancement devices included in a single monolithic structure such as Motorola MC14106B to perform waveform generation, sensing, comparison and control functions. The Schmitt Triggers are configured to deliver as an astable oscillator in circuit with a sensing antenna through a balance circuit as well as deliver as an audio oscillator to drive a piezo element to alert the driver of the present of an invading mass or obstruction adjacent to the sensing antenna. A different Hex inverter MC 4069 in the control module can drive the audio function.

Shaping and conditioning of the reference waveform generated by the free running oscillator are also provided, as is a comparison function in association with a series of strobing diodes resulting in a strobed output summing function between a Schmitt sense and a Schmitt reference trigger associated with the free running oscillator. The resulting inverted output is then connected to a pair of signal comparators. Such comparators have their noninverting inputs connected to a set point reference delivered to the comparators.

As an obstructing mass is sensed by the antenna (due to changed dielectric effect), the strobed output generated by the Schmitt Triggers is modulated by the effects provided by the object. As a result, an inverted, and amplified object output signal appears at the inverted inputs of the signal comparators, which is lower than the set point reference of the system. As the output state of the comparators goes HI, visual and audio indicators adjacent to the operator of the vehicle are driven to active states. Consequently, the operator of the vehicle is warned of the approaching objects adjacent to the air dam well before impact occurs. Evasive action then can be initiated.

In another aspect of the invention the circuitry provides an automatic calibration function for linearizing operations via a automatic calibration circuit that on power-up, delivers a rising biasing level to provide auto calibration, sample-and-hold function in circuit with the Schmitt sense and reference triggers.

As a result the configured Schmitt triggers are able to perform waveform generation, sensing, comparison and conditioning functions. Furthermore, the signal comparators are able to drive exterior indicators through an audio oscillator also configured from the Schmitt triggers. A FET switching array permits automatic calibration.

The sensing antenna previously mentioned is positioned transverse of the rotational axes of the front wheels and insulated from the vehicle in circuit with the Schmitt sensing trigger through the balance circuit. The antenna includes a capacitance-inductance filter in circuit with the resistance balance to increase insolation between the antenna and the remainder of the circuitry of the invention as well as provide for filtering of low and high frequency interference signals sensed by the antenna.

The strobed output of the sensing and reference Schmitt Triggers are shaped, inverted and amplified by an enhancing circuit including monolithically structured amplifying transistors having a base of a first transistor in circuit with the junction point of the sensing and reference triggers, and a resistance-capacitance circuit at its emitter. The conditioned signal is next inverted and amplified by a second monolithically structured amplifying transistor having the following characteristics: (i) its base is coupled to the emitter of the first transistor, (ii) its emitter is coupled to ground and (iii) its collector is coupled to the inverting inputs of the signal comparators. Since the conditioned object signal is inverted by the second monolithically structured transistor, re-inversion at the inverting inputs of the signal comparitors permits comparison with the system bias reference applied to the non-inverting inputs of the comparitors in straight forward fashion.

DETAILED DESCRIPTION OF A PREFERRED EMBODIMENT OF THE INVENTION

Figure 1:
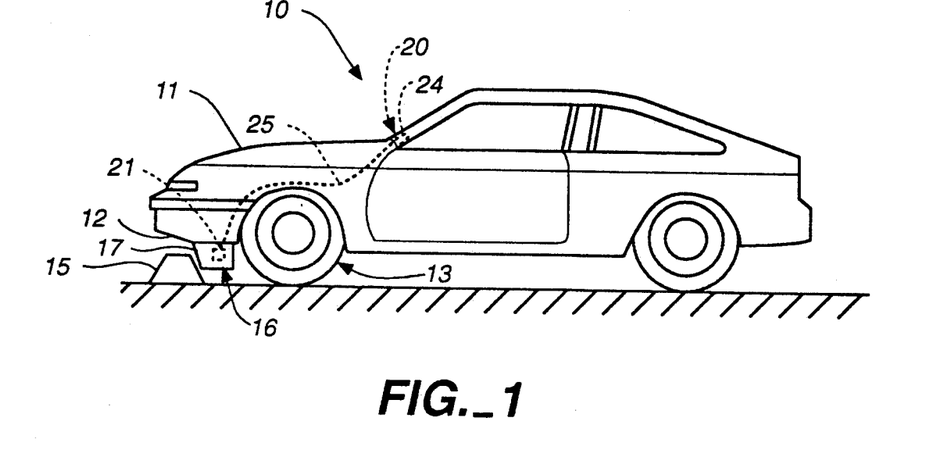
FIG. 1 is a side elevation view of a motor vehicle having a forward underbody air dam incorporated with an automatically calibrated sensing and driving circuit module; a display and control module at the interior of vehicle adjacent to the operator's seat; and a wiring harness for interconnecting the modules with a conventional 12 volt battery.

FIG. 1 illustrates a motor vehicle 10 having a front end 11 and underbody 12 located forward and above front wheels 13. The front wheels 13 are seen in contact with the earth's surface 14 adjacent to a concrete parking bumper or curb 15 of the type used in parking lots. An air dam 16 is mounted on the underbody 12 of the front end 11 at a longitudinal position that is forward of the front wheels 13. The functions of the air dam 16 are to reduce aerodynamic drag, increase loading on the wheels the vehicle 10 and conceal the undercarriage of the front suspension and engine (not shown) that may be usually visible to a casual on-looker. While the purpose of the concrete parking curbs 15 is to only engage the front wheels 13, their height coupled with the lowered vertical clearance of the air dam 16 above the earth's surface 14, may cause the air dam 16 to be crushed as forward movement of the vehicle 10 occurs. Such impact usually occurs at front surface 17 and under surface 18 of the air dam 16. Usually, the back surface 19 of the air dam 16 remains in tact.

For the purpose of sensing the presence of the curb 15 and alerting the operator of the danger, the present invention provides an automatically calibrated sensing and alerting system generally indicated at 20 composed of monolithically structured elements as discussed below. The sensing and alerting system 20 of the invention includes a sensing and driving circuit module 21 attached to underbody 12 and includes a sensing antenna 23 attached to the inside of the front surface 17 of the air dam 16 running substantially parallel to the axes of rotation of the front wheels 13. At the interior of the vehicle 10 is a display and control module 24. The display and control module 24 is electrically connected to the sensing and driving module 21 by means of a wiring harness 25.

Figure 2:
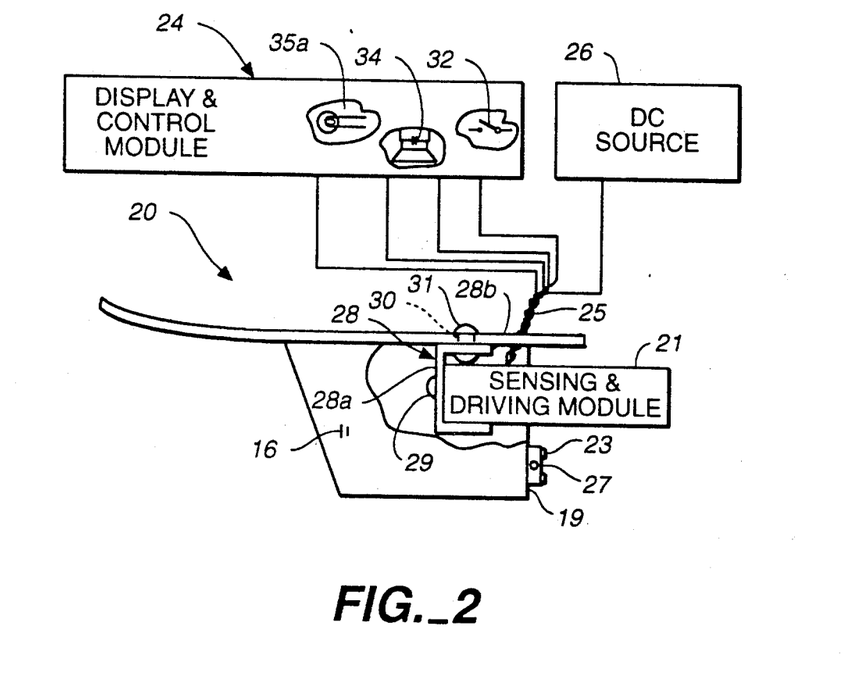
FIG. 2 is a detail fragmentary view of the air dam of FIG. 1 showing attachment of a sensing antenna to the air dam as well as electrical connection to the sensing and driving circuit module of FIG. 1, to the display and control module and to the sourcing module of the present invention in block form.

As shown in FIG. 2, a source of electrical energy such as conventional 12 volt battery 26 is used to power the sensing and alerting system 20 including the sensing antenna 23 by connection to wiring harness 25. The antenna 23 is of a circular cross section and is attached by suitable adhesive such as silicon to the back surface 18 of the air dam 16. Mechanical attachment of the circuit module 21 adjacent to the air dam 16 is via a Unshaped bracket 28. The bracket 28 includes a central leg 28a having a series of openings (not shown) through which rivets 29 extend to attach the sensing and driving module 21 relative to the central leg 28a. In turn, upper leg 28b is similar constructed with an opening 30 by which rivet 31 attaches the bracket 28 (and module 21) relative to the underbody 12.

In operation, after closure of switch 32, the sensing and alerting system 20 senses the presence of objects that would impact the air dam 16 when such objects are adjacent to the sensing antenna 23 and alerts the operator via activation of a piezo element 34 and light 35a of display and control module 21. In that way, visual and audible warnings is imparted so that evasive action can occur. That is, the operator is warned that further forward movement of the vehicle will cause damage to the air dam 16.

Figure 3:
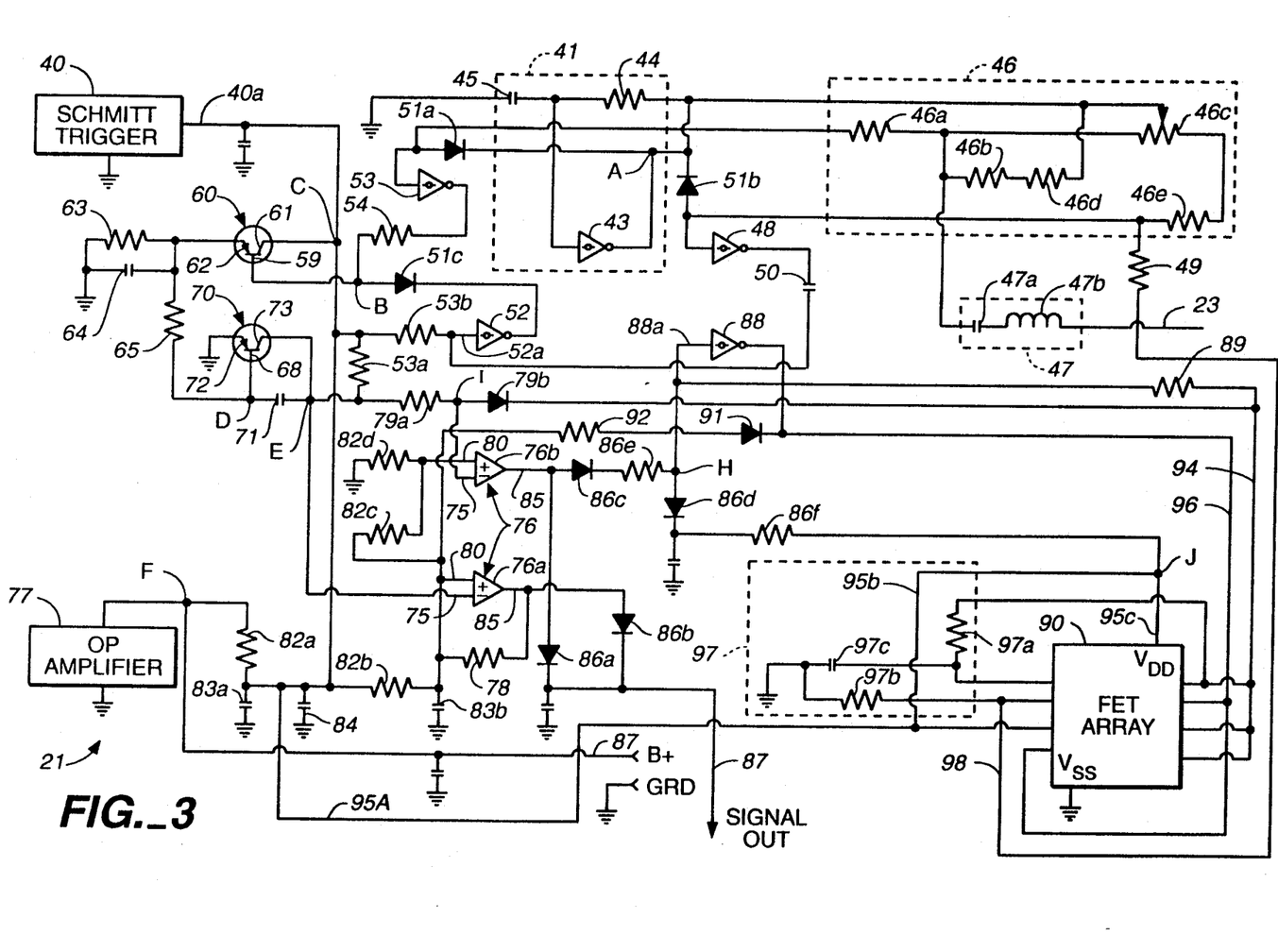
FIG. 3 is a schematic circuit diagram of the sensing and driving circuit module of FIGS. 1 and 2.
Figure 4A:
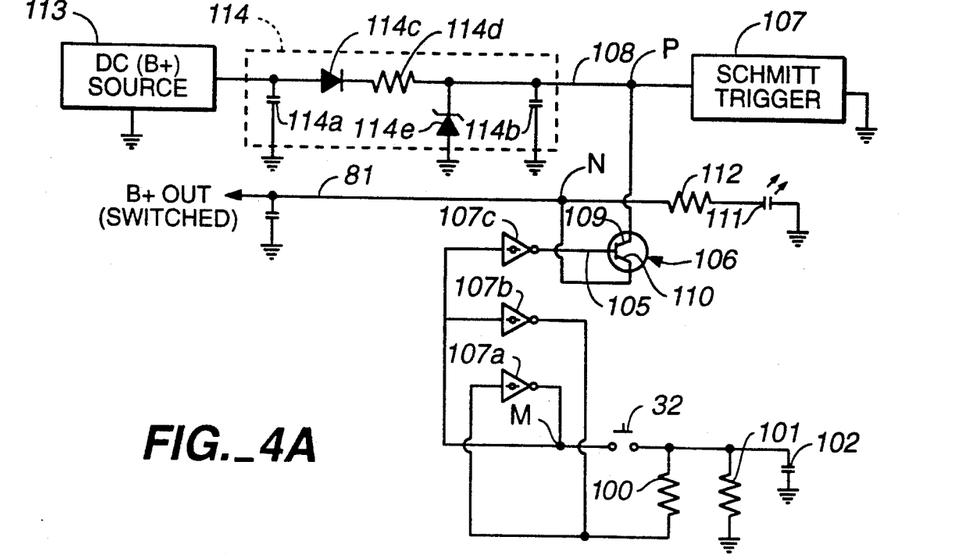
FIGS. 4a and 4b are schematic circuit diagrams of the display and control module of FIGS. 1 and 2.
Figure 4B:
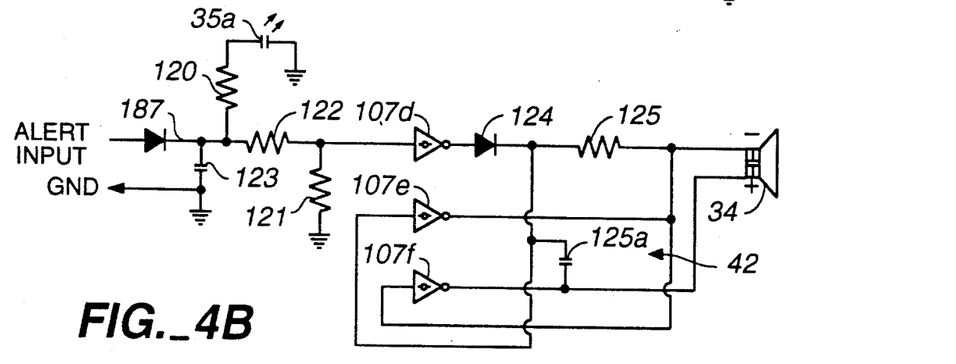

FIGS. 3, 4 and 5 illustrate the sensing and altering system 20 of the invention is still more detail.

SENSING AND DRIVING MODULE 21

In FIG. 3, the sensing and driving module 21 (including sensing antenna 23) is shown is detail, and includes a free running astable oscillator 41 including capacitor 45 and resistor 44 to establish a RC phase lag that permits circuit oscillations, and a monstable audio oscillator 42 see FIG. 4b including resistor 125 and capacitor 125a, both oscillators 41, 42 being both configured from a monolithically structured Schmitt Trigger 40 having an output 40a connected to a DC voltage source. That is, the Schmitt Trigger 40 is configured to deliver as a free-running first astable oscillator 41, and audio oscillator 42 oscillatory waveforms for the purposes as described below.

Connected to the free running oscillator 41 are a sensing sub-Schmitt trigger 53 and a reference sub-Schmitt trigger 48 (also configured from the monolith Schmitt) in circuit with balance circuit 46 and sensing antenna 23 through a filter 47. In a similar manner, connected between the sensing and reference sub-triggers 53, 48 are a pair of inverting sub-Schmitt triggers 43 and 88 (also configured from the Schmitt) whose purpose is as described below having stobing diodes 51A and 51B in circuit to aid in removal of the capacitance charge accumulated on the sense sub-trigger 53 and on the reference sub-trigger 48 during the negative or low portion of the clock cycle delivered thereby. Such diodes 51a and 51b are forward biased during that segment of cycle. Diode 51c in circuit with inverting gate 52 blocks B+ bias voltage from the output of the latter during low input conditions of the sense sub-trigger 53 as well as permits the sub-trigger 52 to act in a sinking manner to voltage delivered to point B via resistor 54 when algebraic summing between sense sub-trigger 53 and reference sub-trigger 48 is achieved, as described below.

The equivalent monolithic Schmitt trigger with sub-Schmitt triggers 48, 53, 52, 43 and 88 have the following typical logic diagrams per typical pin settings, and have application in delay, integrator, differentiator switch, gate and transfer arrays as well as in monostable and astable multivibrator circuitry as provided in specification sheets of Motorola's Hex(N=6) Schmitt Trigger, MC14106B.

Figure 6:
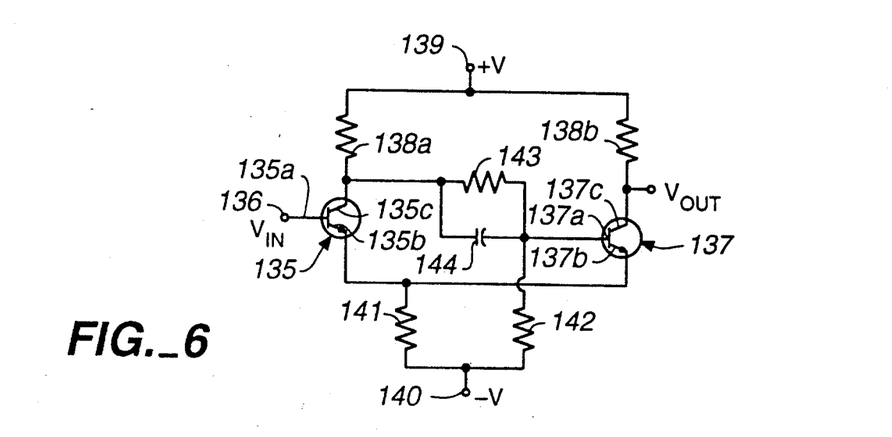
FIG. 6 is circuit diagram of a typical Schmitt trigger.

Each Schmitt inverting trigger or limiter is defined as a waveform generator in which an output pulse of constance amplitude exists only as long as the input voltage remains below (0=1) (1=0) a certain value. The circuit can convert a slowly changing input waveform to an output waveform of sharp transitions. There is hysteresis (variation in response) between upper and lower toggle levels. As shown in FIG. 6, the Schmitt Trigger usually includes a base driven input NPN transistor 135 having a base 135a connected to input terminal 136, and emitter 135b and a collector 135c and an output NPN transistor 137 having base 137a, an emitter 137b and a collector 137c connected to output terminal 138. The collectors 135c, 137c are interconnected through a pair of resistors 138a, 138b each in series with a control voltage terminal 139. The emitters 135b, 137b are directly connected and include a parallel circuit of resistor 140, control voltage terminal 141 and resistor 142 also connected to base 137a of transistor 137. The collector 135c of the input transistor 135 is connected to the base 137a of the output transistor 137 through resistor 143 and capacitor 144 in parallel connection with each other.

The balance circuit 46 as a set of sensitive and balance voltage dividers and operates in the following manner. Note that the balance circuit 46 uses the clock signal from Schmitt Trigger 40 via FET array 90 to charge sense trigger 53 and reference trigger 48, respectively. In this regard, resistors 46a and 46e provide a gross balancing function initially in order to compensate for differences in the operating characteristics of the sense trigger 53 and reference trigger 48. In addition, since the resistor 46a and 46e also are in circuit with other elements of the balance circuit 46, there is a decrease in sense line and bias loading into the latter. Fine tuning of balance circuit 46 occurs via trimmer potentiometer 46d. In use, the latter is activated to permit a zero output condition after automatic calibration has occurred.

Similar, the filtering circuit 47 comprises capacitor 47a in series with inductor 47b to increase isolation between the antenna 23 and the remainder of the circuitry of the invention as well as provide for isolation of low and high frequency interference signals.

Shaping and conditioning of the waveforms generated by the oscillator 41 in association with reference trigger 48 and with sensing trigger 53, are also provided, as is a comparison function at point B in association with the strobing diodes indicated at 51a and 51b. The diode 51a is coupled in circuit with the input of the sensing trigger 53 adjacent to junction point A at the output of the free running oscillator 41. The diode 51b is coupled in circuit with the input 48a of the reference trigger 48 between the junction point A of the oscillator 41. The diode 51c is coupled in series with junction point B at the output of the inverting trigger 52.

Connected in circuit with input 52a of inverting trigger 52 are resistors 53a, 53b. A resistor 54 is coupled between junction point B and inverting trigger 53.

Also connected in series with junction point B is base 59 of transistor 60 having a collector 61 connected to voltage source point C of the system and an emitter 62. The emitter 62 connects via parallel resistor 63 and capacitor 64 and limiting resistor 65 to drive point D. The drive point D, in turn, is in series with base 68 of inverting and amplifying transistor 70 and capacitor 71. The transistor 70 is monolithically structured and includes an emitter 72 and a collector 73. The emitter 72 is grounded. The collector 73 is connected to drive point E and thence to inverting inputs 75 of dual signal comparators generally indicated at 76, such comparators being configured from monolithically structured integrated circuit operational amplifier 77. One of such comparators, viz., operational amplifier 76a includes a feedback resistor 78 and an output 85 in circuit with signal out line 87 through diode 86b. The other of the such comparators, viz., operational amplifier 76b, includes an inverting input 75 in series with resistor 79a and diode 79b and an output 85 in series with line 87 through diode 86a and with junction point H through diode 86c and resistor 86e. Non-inverting inputs 80 of the comparators 76 are source biased via a biasing signal entering via biasing line 81, and thence through junction point F, resistors 82a, 82b, 82c and 82d. Several smoothing capacitors are placed between the biasing line 81 and ground, two of which are indicated at 83a and 83b, as is Zenor diode 84 for the purpose of limiting signal comparison operations to a predetermined lower voltage level. Note that at the outputs 85 of the operational amplifiers 76 are the series of diodes 86a..86d. The diodes 82a, 82b couple the outputs 85 of the operational amplifiers 76 to output line 87. The diode 86c connects to an output leg 85 of the operational amplifier 76b via junction point G, resistor 86e, to junction point H and thence to (i) input 88a of inverting trigger 88 in parallel with limiting resistor 89 and (ii) to diode 86d, capacitor 86h, resistor 86f and junction point J to FET switch array 90. Note that limiting resistor 89 is also parallel to junction point I and diode 79b at the input 75 of the operational amplifier 76b. At the output of the inverting trigger 88 is diode 91 in series with resistor 92 as well as control line 96 of the FET array 90. Control lines 94 and 96 connect to the FET array 90 as shown in TABLE I and operate as follows:

| Legend: 1 = HIGH (=> 2.5 V); 0 = LOW (=< 2.5 V); NC = NOT CONNECTED; = RISING OR VARIABLE | | |
|---|---|---|
| PIN | CONDITION AUTO CALIBRATION | SENSING |
| 1 | NC | NC |
| 2 | NC | NC |
| 3 | | |
| 4 | | |
| 5 | 1 | 1 |
| 6 | 1 | 0 |
| 7 | 0 | 0 |
| 8 | 0 | 1 |
| 9 | NC | NC |
| 10 | 0 | 1 |
| 11 | 1 | 0 |
| 12 | 1 | |
| 13 | 0 | 1 |
| 14 | 1 | 1 |

Control line 94 of course, represents the inverted potential generated at control line 96. In operation, during power up, the input 88a of trigger 88 is held LOW since the latter is in series with an uncharged capacitor 86h associated with diode 86d and resistor 86f. The output of the trigger 88 via control line 96 is in series with FET array 90 and is placed in its respective inverted representation as a HIGH. Thus, the control line 96 forward biases internal switching with the FET array 90 and provides a high output (B+) to charge the calibration reference capacitor 97c as well as reverse biases diode 91 to isolate any effect on circuitry connected to the anode of the diode 91; and permits a reference ramp voltage to be generated bias resistor 97a into capacitor 97c. The ramp voltage is delivered as a bias voltage via resistor 49 to reference inverting trigger 48. The control line 96 inverts its status to LOW after receiving a HIGH via a HIGH on input 88a of trigger 88. The change in status of the control line 96 removes the B+ bias charging source from the reference capicitor 97c and places the FET array 90 into a sample-and-hold function for the bias reference and provides a pull-down, sink function via resistor 92 and diode 91 so as to modify the noninverting reference voltage after calibration. Also at power up, the inverted potential of the control line 94 is LOW, and acts as a pull down function for the inverting input 75 of the operational amplifier 76b by way of diode 79b and current limiting resistor 79a.

The FET array 90 is connected to input source junction F via control lines 95a, 95b and 95c. In this regard, note that junction point J of the lines 95b and 95c also connects to junction point H at the output of the operational amplifier 76b through diode 86c, resistor 86e, diode 86d and resistor 86f. The FET 90 also includes a sample-and-hold function. The resistor 97b keeps bias line 98 at low impedance with respect to the resistor 49.

DISPLAY AND CONTROL MODULE 24

FIGS. 4a and 4b illustrates the display and control module 24 of the present invention in more detail. As shown, the module 24 includes the ON-OFF switch 32 in series with feedback resistor 100, grounded resistor 101 and grounded capacitor 102 for establishing an inverted from previous state potential at junction point M when the switch 32 is closed. In that way, base 105 of switching transistor 106 via monolithically structured Schmitt trigger 107 via sub-Schmitt triggers 107a... 107f permits current flow from sourcing line 108 through collector 109 to emitter 110 and thence to system biasing line 81 at drive point N. The system bias line 81 also activates activation light 111 via limiting resistor 112 as well as activates the sensing and driving module 21 as previously explained. The sourcing line 108 connects to DC source 113 to junction point P to the collector 109 of transistor 106 through input circuit 114. The latter comprises smoothing capacitor 114a, regulating capacitor 114b, current limiting diode 114c and resistor 114d, and regulating Zenor diode 114e.

On the input side of the module 24 as shown in FIG. 4b is drive line 87 connected to the sensing and driving module 21 as explained previously. The drive line 87 connects to indicator light 35a via limiting resistor 120 in series with a voltage divider comprising resistors 121, 122 and smoothing capacitor 123. The monolithically structured Schmitt trigger 107 also includes sub-triggers 107d... 107f connected to form audio oscillator 42 to drive piezo element 34 through diode 124, resistor 125 and capacitor 125a. Resistor 125 and associated disc capacitor 125a from a R/C time constant along with sub-trigger 107e and 107f to provide the oscillator 42 whose oscillation function is gated ON or OFF via diode 124 and sub-trigger 107d. A voltage present on alert LED 35a via resistor 120 is seen to drive the sub-trigger 107d. An inverted LOW output removes the saturation potential from the feedback components thus allowing oscillation and generates the audio indicator drive waveform required. Diode 124 isolates the feedback oscillation signal from the now LOW output level of the sub-trigger 107d.

In operation, note in FIG. 3, that the positive (or charge transition) of the clock waveform charges the inputs of the reference sub-trigger 48 and the sense trigger 53 via resistors 46e, 44 and potentiometer 46d of the balance circuit 46. The effects of the following result in a HI drive level at the junction point B at the base of transistor 49: zero balancing within the balance circuit 46; the calibration bias influence provided via resistor 49; and the inverse summing effect provided by inverting sub-trigger 52 and associated components resistor 53b and capacitor 50. Such HI drive level represent no object or sense bias at sense sub-trigger 53 sensed by the antenna 23. But when objects are introduced with the sensors range via the antenna 23, the effects of such objects are coupled to the circuit, alter the comparator function and produce an altered signal and resultant audible and visual indication.

OPERATIONAL ASPECTS

The operation of the sensing and alerting module 21 and the display and control module 24 can more easily be explained by reference to functions they provide, viz., (i) by object sensing, (ii) by auto-calibration and (iii) by indicator driving power.

OBJECT SENSING

After power up, the oscillator 41 operate in the following manner to sense the presence of an object adjacent to the air dam of the vehicle of FIG. 1. In this regard, note that the astable oscillator 41 configured of the Schmitt Trigger 40 operate at a frequency F, while the audio oscillator 42 (FIG. 4b) operating at a frequency F1 where F<F1. The waveform of the audio oscillator 42 is stable and repeatable. As previously mentioned with respect to FIG. 4b, the resistor 125 and associated disc capacitor 125a form a R/C time constant along with sub-triggers 107e and 107f to provide the oscillator 42 whose oscillation function is gated ON or OFF via diode 124 and sub-trigger 107d. A voltage present on alert LED 35s via resistor 120 also is seen to drive the sub-trigger 107d. An inverted LOW output removes the saturation potential from the feedback components thus allowing oscillation and generates the audio indicator drive waveform required. Diode 124 isolates the feedback oscillation signal from the now LOW output level of the sub-trigger 107d.

Figure 5A:
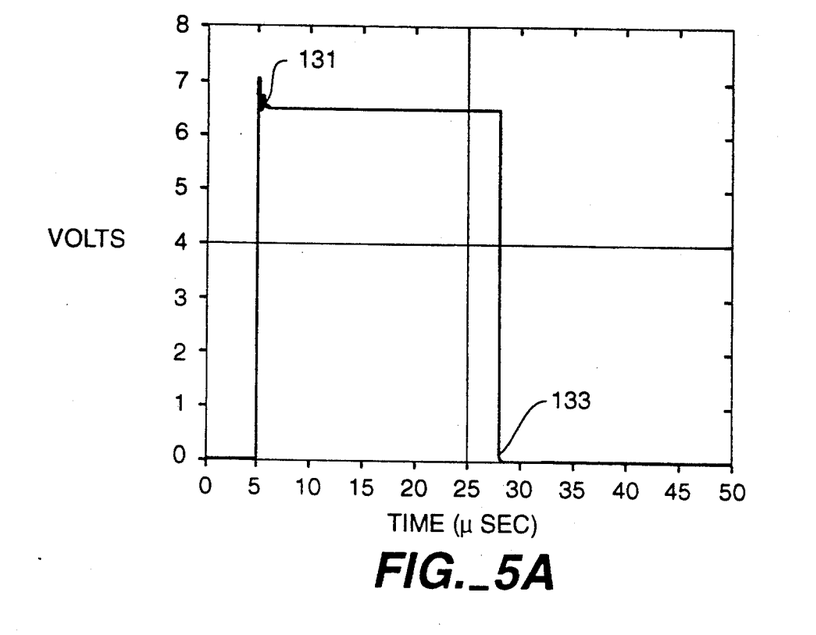
FIGS. 5a, 5b, 5c and 5d are waveforms associated with operations of various circuit elements of the modules of FIGS. 3 and 4.
Figure 5B:
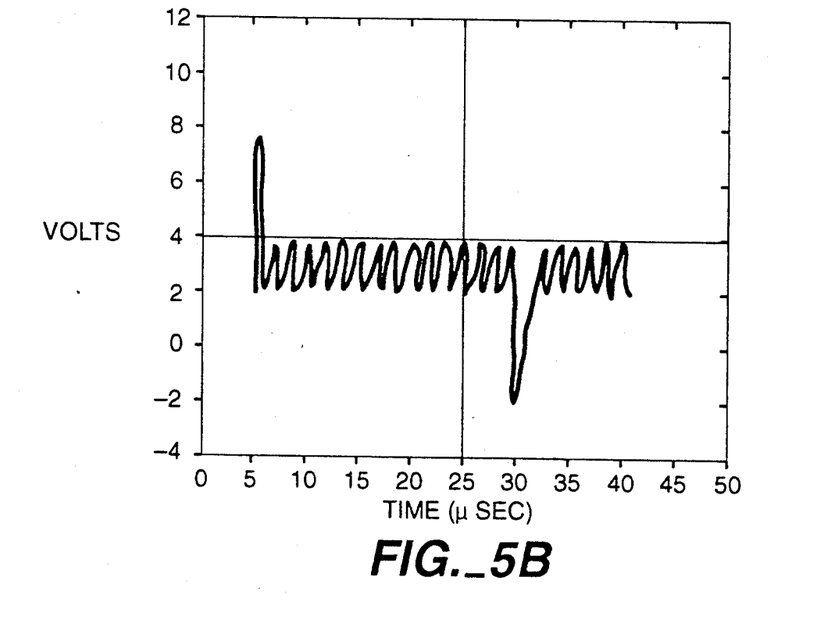

In more detail, assume that the astable oscillator 41 and the audio oscillator 42 generate the waveforms as set forth in FIGS. 5A and 5B. Note further that the positive going signal 130 of FIG. 5A associated with oscillator 41 reaches peak 131, the logic governing operation of the remaining circuitry of the invention.

In operation, note in FIG. 3, that the positive (or charge transition) of the clock waveform charges the inputs of the reference and sense sub-triggers 48, 53 as previously described via the balance circuit 46. The effects of the zero balancing of the balance circuit 46; the calibration bias influence provided via resistor 49; and the inverse summing effect provided by inverting sub-trigger 52 and associated components resistor 53b and capacitor 50, result in a HIGH drive level at reference point B at the base of transistor 59. Such HI drive level represent no object or sense bias at sense gate 53. But when objects are introduced with the sensors range, the effects of such objects are coupled to the circuit via sensor antenna 23 and are introduced to alter the comparator function and produce an altered signal and resultant audible and visual indication.

Then when the downgoing signal 130 reaches trough 133, the following logic governs operation of the above mentioned circuit elements.

The zero voltage of the clock line at trough 133 permits discharging of the previously delivered charge accumulated during the positive clock cycle into the characteristic gate input capacitance at sensing and reference sub-triggers 53, 48 via the now forward biased strobing diodes 51a and 51b. This allows a succession of pulses from repetitive clock cycles to be averaged and summed, with the summed average being modulated by objects on the sense line including the antenna 23.

That is, as a capacitive mass is sensed by the antenna 23, the clock signal on sense line 98 charges sense sub-trigger 53 and reference sub-trigger 48 via the balance circuit 46. Fixed value resistor 46a and 46e provide gross balancing to compensate for major differences in the sense and reference sub-triggers 53, 48 as well as decreases sense line 98 and bias loading into the balance circuit 46. Fine tuning is achieved via trimmer potentiometer 46d to allow the zero output balanced condition after automatic calibration has occurred. This allows a succession of pulses from repetitive clock cycles to be averaged and summed, with the summed average being modulated by objects on the sense line including he antenna 23.

DRIVING FUNCTION

Figure 5C:
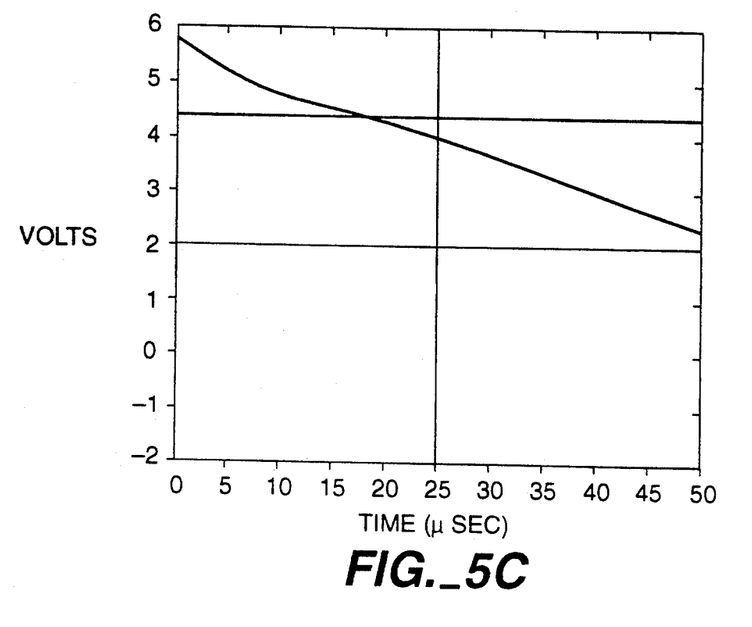
Figure 5D:
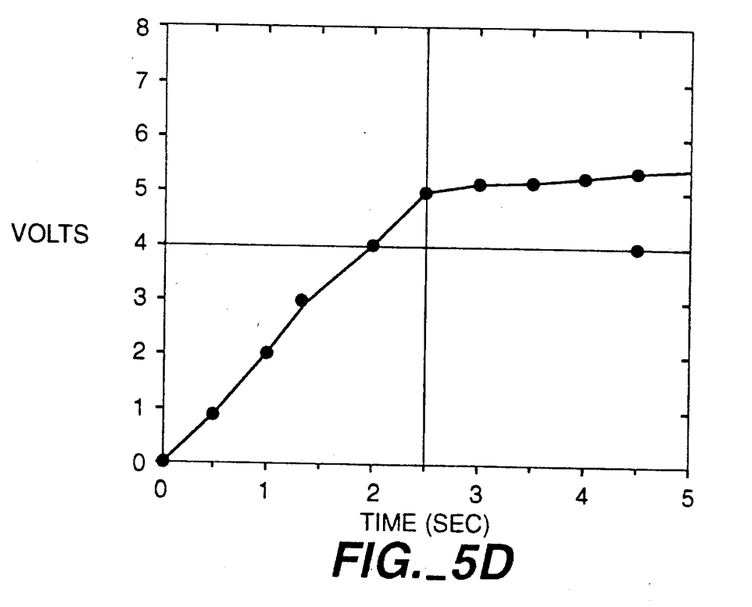

After the capacitive mass is sensed, the object signal from the transistors 60, 70, see FIG. 5C appearing at the inverting inputs 75 of the operational amplifiers 76 is lower than the system reference voltage at non-inverting inputs 80, FIG. 5. And the output state of the operational amplifiers 76 goes HI to drive a series of indicators interior of the vehicle, as explained above, to active states. In this regard, a driving logic circuit for the operational amplifiers 76 is as follows.

Operational amplifiers 76 are placed in active state when the negative going summed value of junction B (FIG. 3) at the inverting inputs 75 of the operational amplifiers 76a, 76b falls below the approximately 4.4 reference at non-inverting inputs 80 as provided. As previously mentioned, the latter is provided via voltage divider consisting of resistors 82b–82d. This results in a HIGH output drive at outputs 85 of the operational amplifiers 76a, 76b which is delivered to the signal output line 87 via isolation diodes 86a, 86b. The HIGH input at sub-trigger 107d (FIG. 4B) is inverted and thus removes B+ saturation as coupled via blocking diode 124. In turn, this allows free oscillation to take place as a result of the R/C time constant of resistor 125 and associated capacitor along with the feedback inverting function of sub-triggers 107e, 107f. This waveform drives a solid state piezo element 34 to produce an audible response in addition to the visual LED indicator 35a all driven from the alert input line 87. The associated visual indicator LED 35a and limiting resistor 120 also serve to keep the alert input line 87 pulled down to a low value when the B+ drive condition is removed.

Consequently, the operator of the vehicle is warned of the approaching objects adjacent to the air dam well before the object impacts the air dam. Evasive action then can occur.

AUTOMATION CALIBRATION

Automatic calibration occurs as follows. On power up, input of sub-trigger 88 is held LOW due to the low impedance provided by uncharged disc capacitance associated with diode 86d and resistor 86f. The resulting HI output of sub-trigger 88 provides bias voltage (B+) for respective FET's of FET array 90 as shown in TABLE I, below, and permits a reference ramp voltage (increasing with time) to be generated via resistor 97a into capacitor 97c and thence to be delivered to the reference sub-trigger 48 as a ramped bias voltage via resistor 49. The purpose of bias drive current driving the sub-trigger 48: to reduce the toggle (invert) point of the latter as a function of each clock cycle. The resulting waveform output of the reference sub-trigger 48 is next shaped, coupled (via the capacitor 50), re-shaped and finally inverted (via gate 52). The sensing sub-trigger 53 is designed to be toggled (change state) at a respective toggle time in which the delay time is a function of input gate capacitance as well as whether or not sensed objects are detected by associated components as discussed above. Hence on power up even without an object in the sensed field there is sufficient gate capacitance to generate a representative waveform at output 53a of the sensing sub-trigger 53.

Next, the sensed and reference outputs of sub-triggers 53 and 48 are compared and algebraically summed at junction point B via limiting resistor 54 and isolation diode 51c.

Due to the ramped nature of the bias voltage, the output of reference sub-trigger 48 gradually increases the drive level to the transistorized shaping, inverting and amplification circuit 130 comprising transistor 59, resistor 63, resistor 65, transistor 70 and capacitor 71. Note that such increases in drive level to circuit 130 results a decreasing net resultant signal input with time to the inverting inputs 75 of the operational amplifiers 76a, 76b. Eventually the inverting input at inputs 75 of the operational amplifiers 76a and 76b falls below the non-inverting reference signal level at non-inverting inputs 80. At that time, the operational amplifier 76a is toggled HI at output 85. Also such HI is delivered via the output 85 of the operational amplifier 76b to the input 88a of gate 88 and switches the output of the gate 88 LOW, thus removing B+sourcing of R/C reference capacitor 97c and associated series charging component, resistor 97a. As a result, the LOW to the FET array 90, viz., to pins 6 and 11, now functions as a sample-and-hold for the auto calibration reference for the circuitry of the invention.

The LOW at the output of sub-trigger 88 also serves to pull down the reference signal presented to non-inverting inputs 80 of the operational amplifiers 76a, 76b as generated via resistors 82b-82d. Hence, a hysteresis effect is easily generated to prevent toggling (change in state) of the operational amplifiers 76a, 76b.

Calibration on indication augments the above as follows: In this regard, note that calibration line 94 is connected to pins 8, 10 and 13 of the FET array 90 of TABLE I. Hence, a LOW on the line 94 as coupled via diode 79b and limiting resistor 79a serves to pull down inverting inputs 75 of the operational amplifiers 76a, 76b well below the signal level of the non-inverting inputs 80. As a result the outputs of the operational amplifiers 76a, 76b are driven HI at outputs 85 and provide a HI to signal out line 87 via diodes 86a, 86b. Simultaneously, free running clock oscillator 41 running at about 22 KHZ drives the sense gate 53 and reference gate 48 through balancing circuit 46 including potentiometer 46d and resistor 46e and thence to the inputs of the sense and reference sub-triggers 53, 48.

At the sense and reference sub-triggers 53, 48 there are time delays due to inductive and capacitive effects in the manner previously mentioned. Such effects influence when togging occurs. With no objects in sensing field of the antenna 23 of the present invention, the balancing potentiometer 46d is used to trim all effects prior to use of the circuit of the present invention. Such trimming effects also take into account effects due to different installation positions so positional integrity of the object to the undercarriage of the automobile can be maintained.

The output of reference sub-trigger 48 is delivered to the sub-trigger 52 in the manner previously mentioned, shaping and coupling (via the capacitor 50), re-shaped and finally inversion (via trigger 52) occurs so as to generate a comparator function (via blocking diode 51c and limiting resistor 54) that is compared with the resultant algebraically summed output of the sense sub-trigger 53 at output 53a. Such compared output appears at junction point B. Further introduction of objects sensed by antenna 23 now results in a sensed waveform of greater positive duty cycle. Note also that the diodes 51a, 51b serve to aid in removal of gate input capacitance of the sense and reference sub-triggers 53, 48 during the low portion of the clock cycle since they are forward biased during such portion of the clock cycle. Diode 51c also serves to block the B+ biasing voltage from the output of sub-trigger 52 during LOW input conditions to the sub-trigger 52 as occurring as previously mentioned. This allows the sub-trigger 52 to act in a sinking manner (drain energy from the system) to voltage delivered to junction point B via the resistor 54 to achieve the algebraic summing function between the sense sub-trigger 53 and the reference sub-trigger 48. The resistor 54 is a current limiter to provide proper base drive current for the transistor 59 and to limit peak current imposed on sub-trigger 53 to acceptable levels when sub-trigger 52 is functioning as a sink when input is HIGH and output is LOW.

In this regard, the pin connection of the FET array 90 is as shown in Table I above under the calibration and sensing operations.

Having described a method and apparatus in accordance with the invention in which advantages can be appreciated by those skilled in the art, it also is evident that certain variations are suggested. There is therefore an intent that such variations be within the scope of the invention as set forth in the following claims.

What is claimed is:

1. In combination, a motor vehicle having an air dam and a front end structure to which said air dam is mounted upon and beneath, said air dam including a deflector panel subject to engagement with an object to be avoided and being damaged by such engagement, an antenna mounted to said motor vehicle adjacent to said air dam to capacitively detect positional proximity of said object to be avoided, a resistance-capacitance balance circuit connected to said antenna, a pair of monolithically structured Schmitt sensing and reference triggers each having an output leg and an inlet leg connected to said balance circuit through a toggle point wherein said toggle point of each varies as a function of loading of said balance circuit, a third monolithically structured Schmitt trigger having an input leg connected to ground through a capacitor and to said balance circuit through a resistor, said capacitor and said resistor forming a free running oscillator to drive said pair of Schmitt sensing and reference triggers through said balance circuit with a drive waveform having a frequency F, said output legs of said pair of Schmitt sensing and reference triggers being connected to a common junction point where a compared output signal is generated as a function of distance of said object to be avoided to said antenna, a signal comparator in circuit with said junction point and having an output leg, said signal comparator being responsive to said compared output signal at said common junction point to generate an alert signal, and means responsive to said alert signal for activating an alarm.

2. The combination of claim 1 in which said means for activating said alarm includes a second resistor and a second capacitor in parallel with each other, fourth and fifth Schmitt triggers connected in a feedback loop, said second resistor, said second capacitor and said fourth and fifth Schmitt triggers comprising an audio oscillator for generating a drive of frequency F1.

3. The combination of claim 2 in which F1<F.

4. The combination of claim 1 with the addition of an auto calibration circuit comprising means for generating a ramped voltage signal, said ramped voltage signal generating means being connected to said input legs of said pair of Schmitt sensing and reference triggers to generate waveforms by which an auto calibration function is provided.

5. The combination of claim 1 with the addition of a pair of strobing diodes in series with said input legs of said pair of Schmitt sensing and reference triggers.

6. In combination, a motor vehicle having an air dam and a front end structure to which said air dam is mounted upon, said air dam being subject to engagement with an object to be avoided and being damaged by such engagement, an antenna mounted to said motor vehicle adjacent to said air dam to capacitively detect positional proximity of said object to be avoided, a balance circuit connected to said antenna, a pair of monolithically structured Schmitt sensing and reference triggers each having an output leg and an inlet leg connected to said balance circuit through a toggle point wherein said toggle point of each varies as a function of loading of said balance circuit, a third monolithically structured Schmitt trigger having an input leg connected to ground through a capacitor and to said balance circuit through a resistor to form a free running oscillator to drive said pair of Schmitt sensing and reference triggers through said balance circuit with a drive waveform having a frequency F, said output legs of said pair of Schmitt sensing and reference triggers being connected to a common junction point where a compared output signal is generated as a function of distance of said object to be avoided to said antenna, a signal comparator in circuit with said junction point and a reference signal whereby occurrence of said compared output signal at said common junction point beyond said reference signal in a selected direction generated an alert signal, and said responsive to said alert signal for activating an alarm.

7. The combination of claim 6 in which said means for activating said alarm includes a second resistor and a second capacitor in parallel with each other, fourth and fifth Schmitt triggers connected in a feedback loop, said second resistor, said second capacitor and said fourth and fifth Schmitt triggers comprising an audio oscillator for generating a drive of frequency F1.

8. The combination of claim 7 in which $F1 < F$.

9. The combination of claim 6 with the addition of an auto calibration circuit comprising means for generating a ramped voltage signal, said ramped voltage signal generating means being connected to said input legs of said pair of Schmitt sensing and reference triggers to generate waveforms by which an auto calibration function is provided.

10. The combination of claim 6 with the addition of a pair of strobing diodes in series with said input legs of said pair of Schmitt sensing and reference triggers.

11. The combination of claim 6 in which said signal comparator includes a pair of operational amplifiers having inverting inputs connected to said junction point and non-inverting inputs connected to a common voltage source.

* * * * *